United States Patent
Kern et al.

(10) Patent No.: US 8,689,208 B2
(45) Date of Patent: Apr. 1, 2014

(54) UPGRADE MANAGEMENT OF APPLICATION COMPONENTS

(75) Inventors: Jonathan Fred Kern, Seattle, WA (US); Timothy Paul McConnell, Kirkland, WA (US); Sean Lamont Grant Livingston, Bothell, WA (US); Hai Liu, Sammamish, WA (US); Luis Angel Mex, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 822 days.

(21) Appl. No.: 12/822,203

(22) Filed: Jun. 24, 2010

(65) Prior Publication Data

US 2011/0321029 A1   Dec. 29, 2011

(51) Int. Cl.
*G06F 9/44* (2006.01)

(52) U.S. Cl.
USPC ............ 717/170; 717/171; 717/173; 717/178

(58) Field of Classification Search
USPC .................................. 717/170, 171, 173, 178
See application file for complete search history.

(56) References Cited

U.S. PATENT DOCUMENTS

| | | | |
|---|---|---|---|
| 6,279,030 B1* | 8/2001 | Britton et al. ................. | 709/203 |
| 6,976,037 B1* | 12/2005 | D'Souza et al. ...................... | 1/1 |
| 7,020,532 B2* | 3/2006 | Johnson et al. ................ | 700/89 |
| 7,389,921 B2* | 6/2008 | Lin et al. ....................... | 235/385 |
| 7,415,706 B1* | 8/2008 | Raju et al. ..................... | 717/170 |
| 7,506,336 B1* | 3/2009 | Ninan ............................. | 717/175 |
| 7,562,358 B2* | 7/2009 | Bennett et al. ................ | 717/170 |
| 7,779,405 B2* | 8/2010 | Gorti .............................. | 717/172 |
| 8,090,452 B2* | 1/2012 | Johnson et al. ................. | 700/17 |
| 8,099,727 B2* | 1/2012 | Bahat et al. .................... | 717/168 |
| 8,151,257 B2* | 4/2012 | Zachmann .................... | 717/170 |
| 8,296,758 B2* | 10/2012 | Kabadiyski ................... | 717/174 |
| 2004/0254648 A1* | 12/2004 | Johnson et al. .................... | 700/1 |
| 2005/0203975 A1 | 9/2005 | Jindal et al. | |
| 2006/0075398 A1* | 4/2006 | Bennett et al. ................ | 717/170 |
| 2007/0261049 A1 | 11/2007 | Bankston et al. | |
| 2008/0301668 A1* | 12/2008 | Zachmann .................... | 717/173 |

(Continued)

OTHER PUBLICATIONS

Wysota, Witold, "Testing User Interfaces in Applications", Retrieved at << http://ieeexplore.ieee.org/stamp/stamp.jsp?tp=&arnumber=4621674 >>, Proceedings of the 2008 1st International Conference on Information Technology, IT 2008, May 19-21, 2008.

(Continued)

*Primary Examiner* — Phillip H Nguyen
(74) *Attorney, Agent, or Firm* — Tom Wang; Jim Ross; Micky Minhas

(57) ABSTRACT

Architecture that enables separation of a user interface (UI) upgrade from the content and application logic upgrade. Administrators can upgrade to take advantage of new infrastructure features, and independently schedule the UI upgrade, for example, to accommodate customization work or to ensure user training. Furthermore, administrators can now allow users to choose when to switch to the new UI. More specifically, the architecture facilitates the separation of a UI upgrade from content and application logic upgrade, the ability to control the UI upgrade at multiple levels of precision, the ability for application logic and UI components to change behaviors based on the UI version of the context, and the ability to "preview" the updated UI before permanently switching to it. Additionally, UI components can be filtered to only appear in the appropriate UI version, and the site's UI version can be compared to versions that a component is compatible with.

18 Claims, 7 Drawing Sheets

(56) References Cited

U.S. PATENT DOCUMENTS

| | | | |
|---|---|---|---|
| 2009/0132915 A1 | 5/2009 | McCraw et al. | |
| 2009/0150773 A1 | 6/2009 | Falkner et al. | |
| 2009/0276660 A1* | 11/2009 | Griffith et al. | 714/16 |
| 2010/0077362 A1 | 3/2010 | Allred et al. | |

OTHER PUBLICATIONS

"Visual Upgrade", Retrieved at << http://msdn.microsoft.com/en-us/library/ff407236(v=office.14).aspx >>, Retrieved Date: Apr. 5, 2010.

"FlexNet Connect: Features", Retrieved at << http://www.flexerasoftware.com/products/flexnet-connect/features.htm >>, Retrieved Date: Apr. 5, 2010.

Slater, David, "iSeries Application Modernization—An Update", Retrieved at << ftp://ftp.software.ibm.com/as400/products/ad/wdt400/papers/ApplicationModernization_UpdateR2.pdf >>, Retrieved Date: Apr. 5, 2010.

"White Paper—Technology Approach", << Retrieved at http://www.subscribe-hr.com.au/pdf/Subscribe-HR_TechApproachWhitePaper.pdf >>, Retrieved Date: Apr. 5, 2010.

\* cited by examiner

UPGRADE MANAGEMENT OF APPLICATION COMPONENTS

BACKGROUND

One of the major hurdles for customers when planning to upgrade software is that the upgrade involves many components and some components may be desired for retained use, while other components can benefit from the upgrade. For example, in some cases, the user may prefer to retain a prior version user interface because of the barrier of learning a new UI in the upgrade, yet upgrade the underlying application logic of the application.

Oftentimes, the new UI changes the way that user needs to interact with the application. Furthermore, changes to the UI may require developers to update extensions to the product to remain compatible. Thus, the monolithic changes typical in applications can introduce obstacles which cause administrators to delay upgrades until users can be trained and extensions are updated. This often means that users cannot take advantage of the backend updates in the new version of the application which may save time and money.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The architecture allows and exploits the separation of application subcomponents (e.g., user interface upgrade from the content and application logic upgrade). Administrators may upgrade to take advantage of new infrastructure features, and may independently schedule the one subcomponent (e.g., user interface) upgrade, for example, to accommodate customization work or to allow for user training. Furthermore, administrators can allow users to choose when to switch to the new subcomponent.

The architecture provides the ability to control the subcomponent upgrade at multiple levels of context precision (e.g., across the farm, across a site collection, for an individual site). Moreover, filtering can be applied to parts (e.g., objects, controls, etc.) of the new subcomponent so that only those filtered parts appear in the appropriate subcomponent version. The subcomponents can change behavior based on the subcomponent version of the context (e.g., the hosting site). The architecture provides the ability to compare the current version of a first site subcomponent to versions of other subcomponents with which the first site subcomponent is compatible. Additionally, the ability is provided to preview the updated subcomponent before permanently switching to it.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
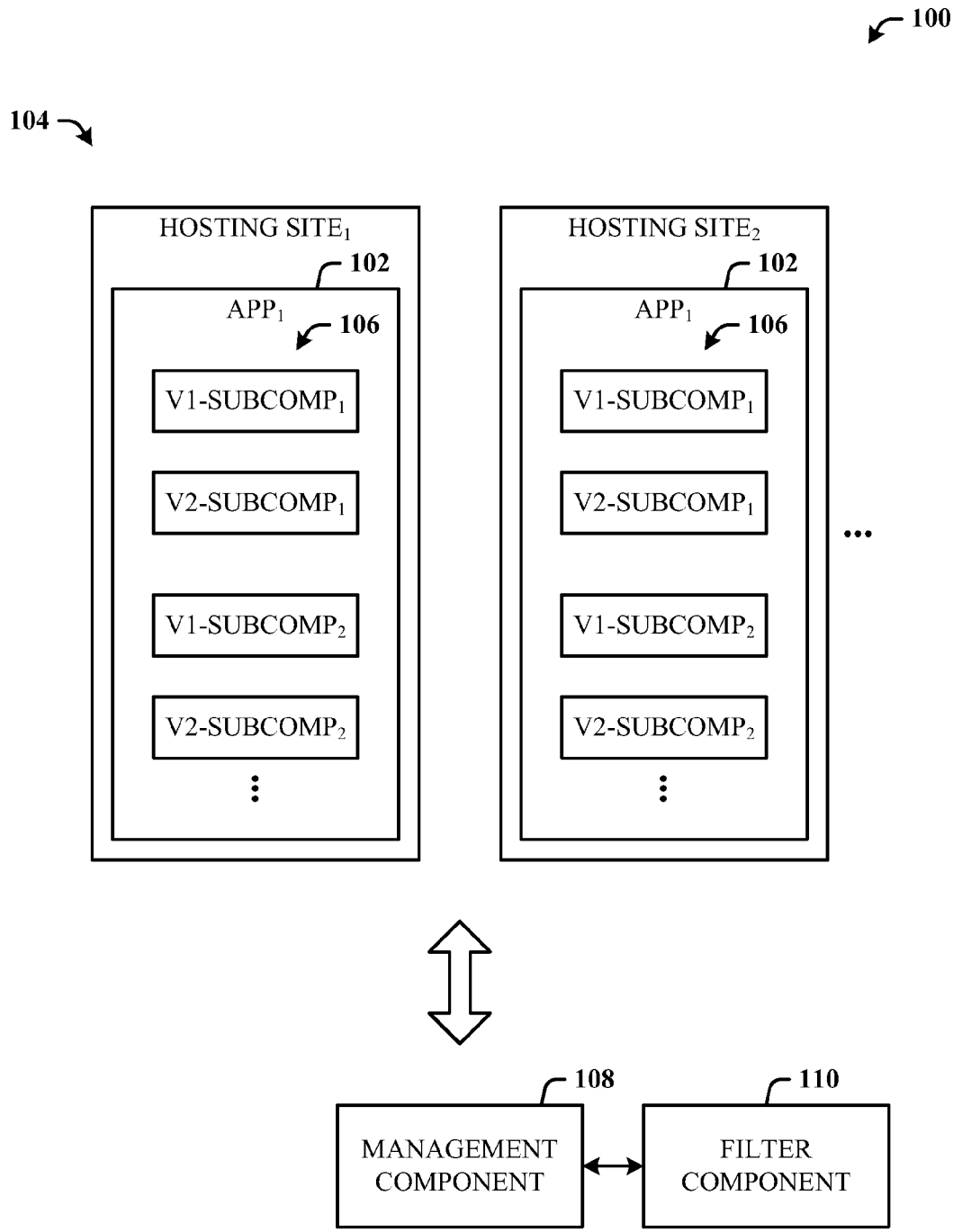
FIG. 1 illustrates a component management system in accordance with the disclosed architecture.

The disclosed architecture allows administrators to separate the user interface "upgrade" from the content and application logic upgrade. As used herein, the term "upgrade" is intended to mean that different versioned files (upgrades) or software subcomponents of an application already existing concurrently on a computing system such that selection of one versioned subcomponent allows said subcomponent to be enabled, previewed, and operated before committal of the subcomponent for actual every-day use. In other words, "upgrade" is not intended to mean the traditional process of downloading and copying new files onto the system, and then overwriting existing prior version files; rather, "upgrade" means to access differently versioned files stored in a side-by-side existence as differently versioned application subcomponents, and then enable operation of a versioned set (an upgrade) or subcomponent as desired, to operate on the same set of data as a different version of the same subcomponent.

In one example, this makes it possible to retain the user interface subcomponent of a previous version of a server application during an in-place or database attached farm upgrade (where a farm is an entire set of hosting sites, and a site collection is a subset of the farm). All the data and settings from the original hosting sites of the farm are preserved, and layout, command organization, and style retain the user interface of the previous server application product. Regardless of the type of farm upgrade selected, all the benefits of the upgrade are received including improved reliability, scalability, and manageability. The option to use the previous user interface subcomponent reduces the likelihood that customized content will cease to function after upgrade. This ensures the continued use of existing hosting sites until all upgrade work has been completed.

After the administrator has performed an upgrade, such as to a site collection, for example, site collection owners can go through the associated site collections to ensure the application and upgraded subcomponents are working correctly. The administrator then has the option either to force through the new subcomponent (e.g., user interface) for all collection sites or to give site owners control over their respective sites. Site owners can preview the new subcomponent on their hosting sites and switch back and forth between the previous and new product versions to fix any issues that might have occurred during upgrade. This ensures that each owner can perform the work to minimize disruptions for the users.

More specifically, the architecture allows and exploits the separation of application subcomponents (e.g., user interface upgrade from the content and application logic upgrade). Administrators may upgrade to take advantage of new infrastructure features, and may independently schedule the one subcomponent (e.g., user interface) upgrade, for example, to accommodate customization work or to ensure user training. Furthermore, administrators can allow users to choose when to switch to the new subcomponent.

The architecture provides the ability to control the subcomponent upgrade at multiple levels of context precision (e.g., across the farm, across a site collection, for an individual site). Moreover, filtering can be applied to parts (e.g., objects, controls, etc.) of the new subcomponent so that only those filtered parts appear in the appropriate subcomponent version. The subcomponents can change behavior based on the subcomponent version of the context (e.g., the hosting site). The architecture provides the ability to compare the current version of a first site subcomponent to versions of other subcomponents with which the first site subcomponent is compatible. Additionally, the ability is provided to preview the updated subcomponent before permanently switching to it.

In a specific implementation, the disclosed architecture enables the separation of a user interface (UI) upgrade from the content and application logic upgrade, the ability to control the UI upgrade at multiple levels of context precision, the ability for application logic and UI subcomponent parts to change behaviors based on the UI version of the context, and the ability to preview the updated UI before permanently switching to it. Additionally, UI components can be filtered to only appear in the appropriate UI version, and the site's UI version can be compared to versions that a component is compatible with.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a component management system 100 in accordance with the disclosed architecture. The system 100 includes an application 102 (e.g., web) hosted on each of multiple hosting sites 104. The application 102 comprises different application subcomponents 106, and each hosting site includes different versions of one or more of the application subcomponents 106.

For example, the application subcomponents 106 can include a first subcomponent (SubComp$_1$), which is a user interface in multiple versions (e.g., V1 and V2), a second subcomponent (SubComp$_2$), which is core application logic in multiple versions (e.g., V1 and V2), and so on.

A management component 108 communicates with the farm, a collection of sites, or a single hosting site to enable operation of an application subcomponent independent of other application subcomponents of the application. In other words, the management component 108 facilitates selection of a first version (V1) of the user interface (SubComp$_1$) for a single site, collection of sites (a collection is a subset of the farm), or the entire farm of sites. Alternatively, as previously indicated, the administrator provides the means to enable certain versions and subcomponents for a site or collection of sites, and the collection owner decided which version and subcomponent to enable full operation. The collection owner then informs the administrator to enable full operation and commit of a selected subcomponent.

Put another way, the different application subcomponents 106 include a different version (e.g., V1) of a core application logic subcomponent that is enabled into operation separate from a user interface subcomponent (e.g., version V2). The different application subcomponents include a different version (e.g., V1) of user interface that is enabled into operation independent of a core application logic subcomponent (e.g., version V2).

The management component 108 enables operation of an application subcomponent on a single hosting site, a collection of hosting sites, or all of the hosting sites (the farm). The system 100 can include a filter component 110 (e.g., as part of the management component 108) that ensures only compatible subcomponents are enabled to interoperate on a hosting site. In an alternative embodiment, each site can include a filter component, or a collection of sites can have a single filter component.

The management component 108 allows a hosting site to operate an application subcomponent before committing the application subcomponent. The management component 108 allows preview of a subcomponent (e.g., visual) before deciding to commit the subcomponent. The management component 108 allows behavioral change of an application logic subcomponent and user interface objects based on a user interface version of a site context (e.g., single site, collection of sites, or farm).

The subcomponents can be enabled or disabled based on manipulation of associated properties. For example, the properties can facilitate version compatibility control such as for a specific version or versions, earlier version(s), later version(s), and so on. Described specifically for a UI subcomponent and core application logic subcomponent, each hosting site includes different versions of the user interface subcomponent and different versions of the core application logic subcomponent. The management component 110 enables operation of a version of the user interface subcomponent on all of the hosting sites, a subset of the hosting sites, or a single hosting site. The management component 110 allows the user interface subcomponent or the core logic subcomponent to operate on a hosting site before commit of the user interface subcomponent or the core logic subcomponent. The management component 110 ensures a version of a site user interface subcomponent is compatible with another application subcomponent, and filters user interface objects to only appear in a compatible user interface subcomponent.

Figure 2:
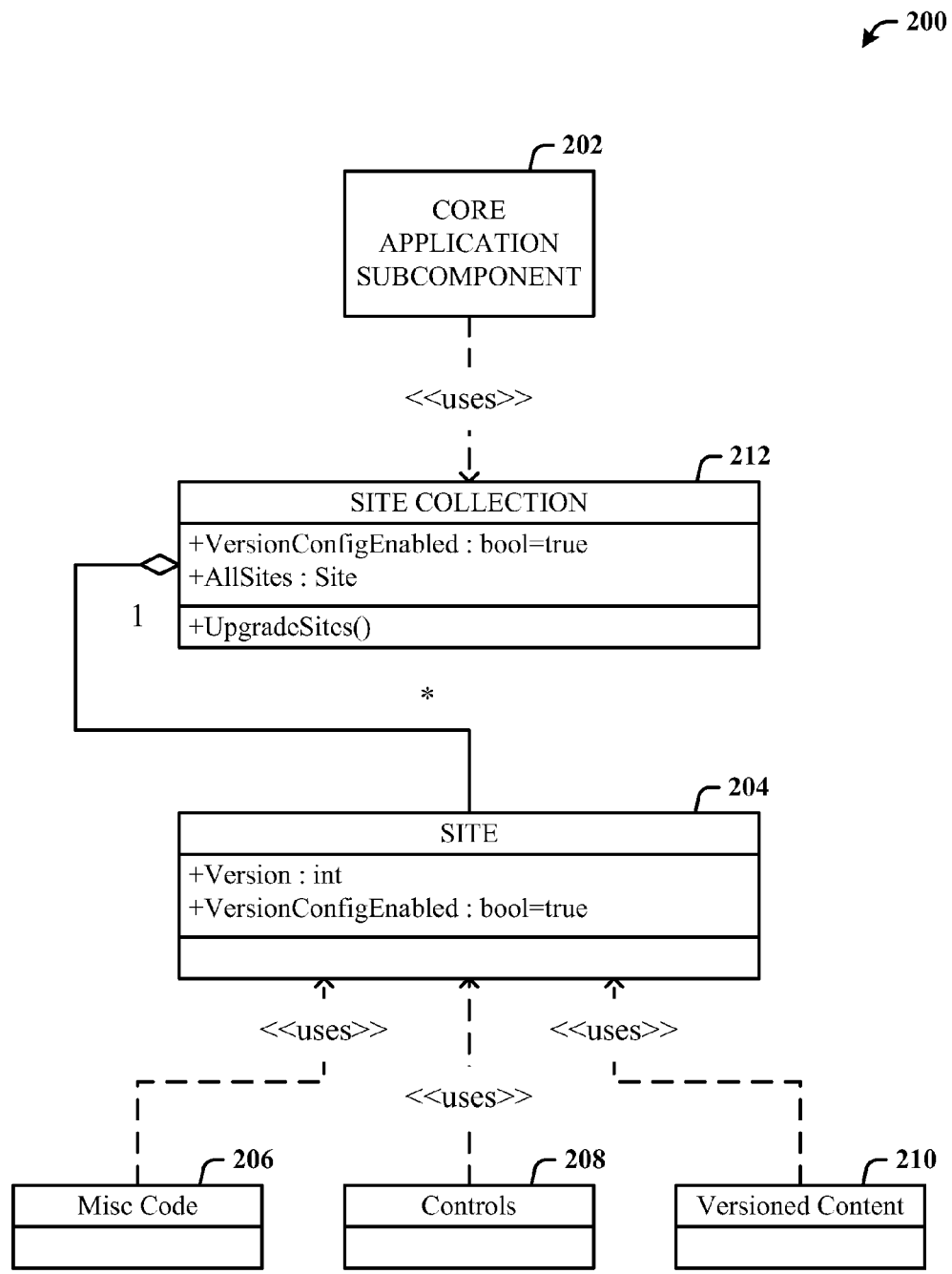
FIG. 2 illustrates an implementation system for upgrade management.

FIG. 2 illustrates an implementation system 200 for upgrade management. The system 200 shows example methods and class relationships for site and site collection management. The system 200 is based, at the core (a core application subcomponent 202), on an integer property on a Site object 204 which represents an individual hosting site in a farm. This property, referred to here as Version, defines which UI the site should use. In this example, the valid values for this property are three (for a prior version UI) and four (for the new version UI). In addition to this property, the Site object 204 also includes a Boolean property (referred to here as VersionConfigEnabled) which specifies whether the settings UI for the site owner is displayed or hidden.

As shown, the two properties on the Site object 204 are used by multiple other components in the site application. For example, the Site object 204 can be used by miscellaneous code 206, controls 208, and UI versioned content 210.

While the UI upgrade is per-site, the upgrade can be controlled in multiple levels of precision via calls between various subcomponents of the server application. For example, a site collection owner can choose to upgrade all hosting sites in the site collection to the new UI. This is accomplished by running SiteCollection.UpgradeSites( ), which internally iterates through the sites in the Site Collection and sets the Version and VersionConfigEnabled properties accordingly.

Similarly, a farm administrator may choose to upgrade all sites on the farm to the new UI during core upgrade. This is accomplished by iterating through all the site collections (e.g., site collection object 212) on the farm and running SiteCollection.UpgradeSites( ) for each.

Multiple entities are based on the value of Version for a site, such as the site's Master Page. The Master Page is the template that all pages in the site use to display site content. It oftentimes contains the command surface, navigation, and chrome of the Site. When Site.Version is set, the Master Page for the site is changed to the appropriate one for the chosen UI. There are default Master Pages for each UI version; however, administrators may use tools to pre-select a Master Page for each UI version.

In addition to the Master Page, internal subcomponents as well as third-party code can fork UI logic based on the Site's Version. A method of pivoting based on the UI version is the VersionedContent web control, which acts as a container to only render if the Version attribute of the control is compatible with the current Site's Version. Compatible versions can be specified.

When upgrading the UI of a Site, the Site owner or higher administrator may choose to preview the new UI before committing the change. Internally, this is done by setting Version to the new UI's value (e.g. four) but leaving VersionConfigEnabled true. Once in preview mode, the site is fully functional, but there can be notification (e.g., yellow status bar) prompting the administrator to finalize the upgrade. Finalizing the upgrade comprises setting VersionConfigEnabled to false, which hides the settings UI and effectively locks the UI into the new look and feel. This "lock" can be overridden by a farm administrator, for example, by running code to set VersionConfigEnabled to true on the site object 212.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
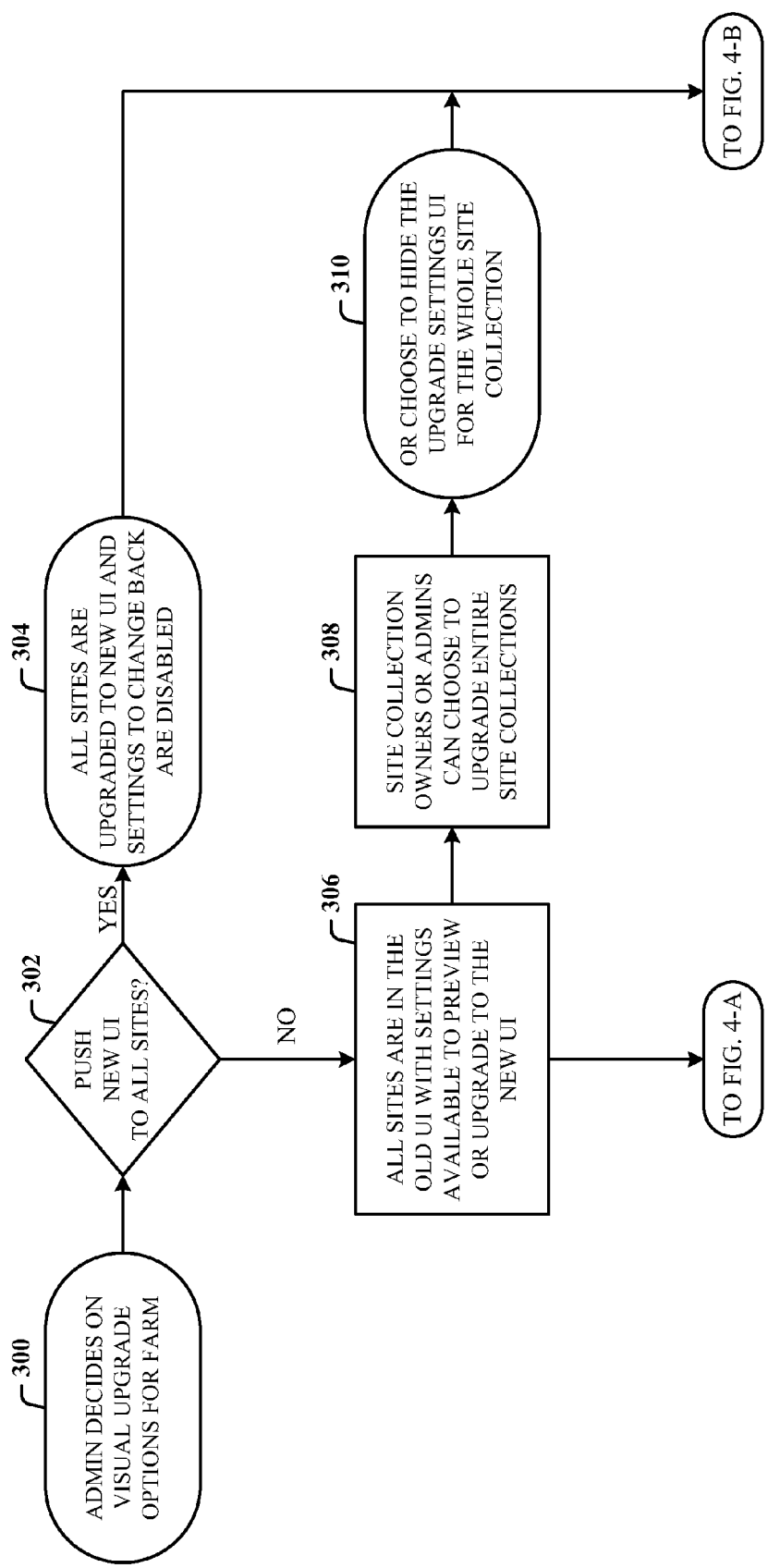
FIG. 3 illustrates upgrade and post-upgrade phases of the component management method.
Figure 4:
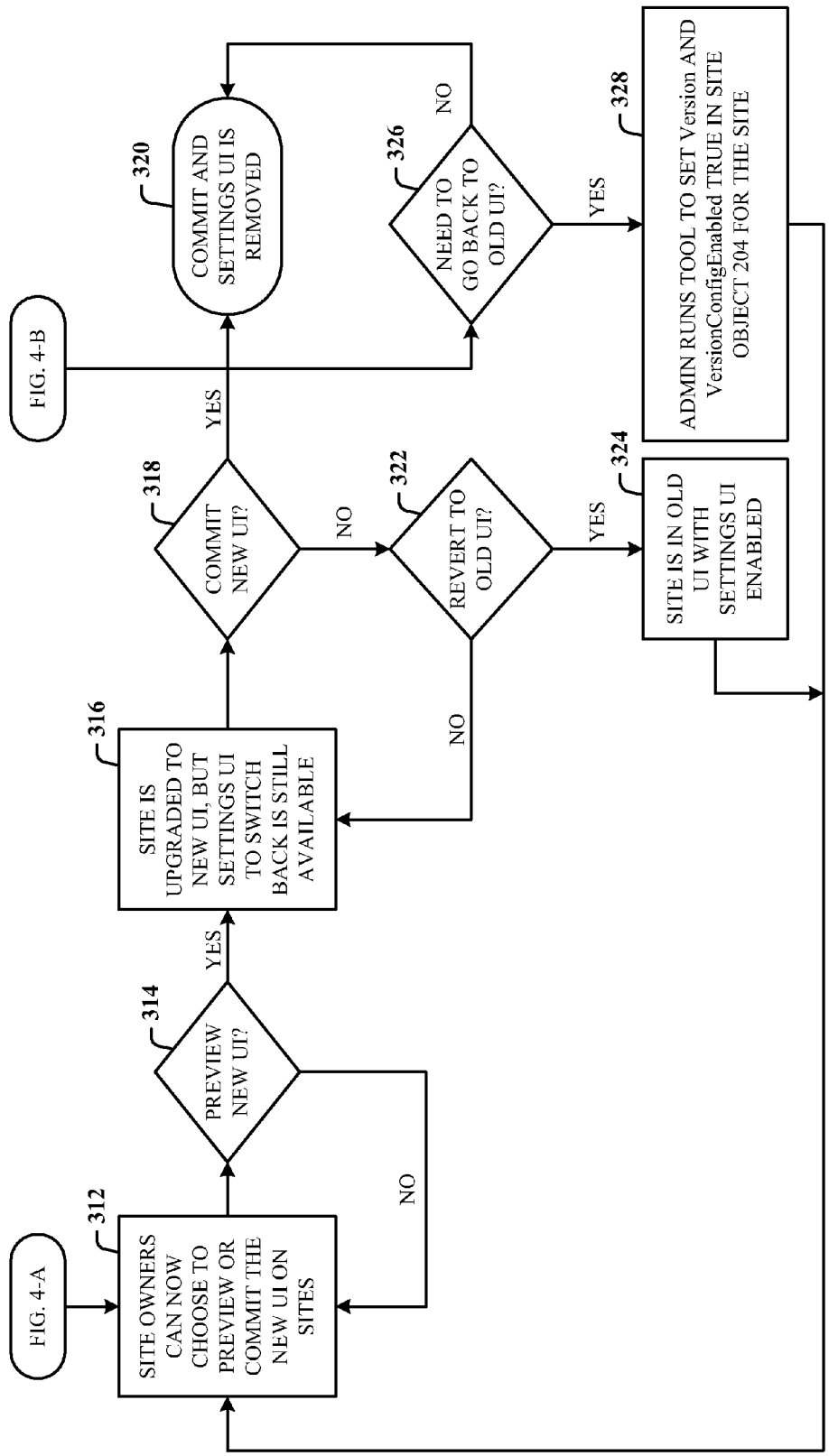
FIG. 4 illustrates a production phase of the component management method.

FIGS. 3 and 4 illustrate a component management method that includes upgrade, post-upgrade, and production phases for deploying visual upgrades (e.g., user interface subcomponent) to hosting sites. FIG. 3 illustrates upgrade and post-upgrade phases of the component management method. At 300, an administrator decides on visual upgrade options for a hosting site farm. At 302, the administrator decides whether to push the upgrade to all sites. If so, flow is to 304 where all sites are upgraded to the new UI and settings to change back to the previous version are disabled. Blocks 300, 302, and 304 are considered part of the upgrade phase. Flow is then to FIG. 4, and will be described in FIG. 4.

At 302, if the new UI upgrade is not pushed to all sites, flow is to the post-upgrade phase, where at 306, all sites retain the old UI with UI settings made viewable to preview or upgrade to the new UI. At 308, site collection owners or the administrator can choose to upgrade entire site collections. At 310, site collection owners or the administrator can choose to hide the UI upgrade settings for the entire site collection.

FIG. 4 illustrates a production phase of the component management method. From 306 of FIG. 3, flow is to 312 of FIG. 4, where site owners can choose to preview or commit the new UI across the collection sites. At 314, if so, flow is to 316, where the sites are upgraded to the new UI, but the UI setting are still accessible to change back to a previous version. At 318, a check is made as to if the new UI is to be committed. If so, flow is to 320, where new UI is committed and the settings UI is removed. At 314, if the new UI is not previewed, flow loops back to 312. At 318, if the new UI is not committed, flow is to 322 to check on reverting back to the old UI. If not reverting, flow is back to 316. Alternatively, if reverting back, flow is from 322 to 324, where the site operates with the old UI and the settings UI remains enabled, flow is then from 324 back to 312.

Flow from 304 and 310 of FIG. 3 is to 326 of FIG. 4, where a check is made to determine a need to revert back to the old UI. If not, flow is to 320 to commit and remover the settings UI. If there is a need to revert, flow is from 326 to 328, where the administrator can run a tool to set the Version property and the VersionConfigEnabled setting to true for the site. Flow is then back to 312 where the site owners or the administrator can choose to commit or preview.

Figure 5:
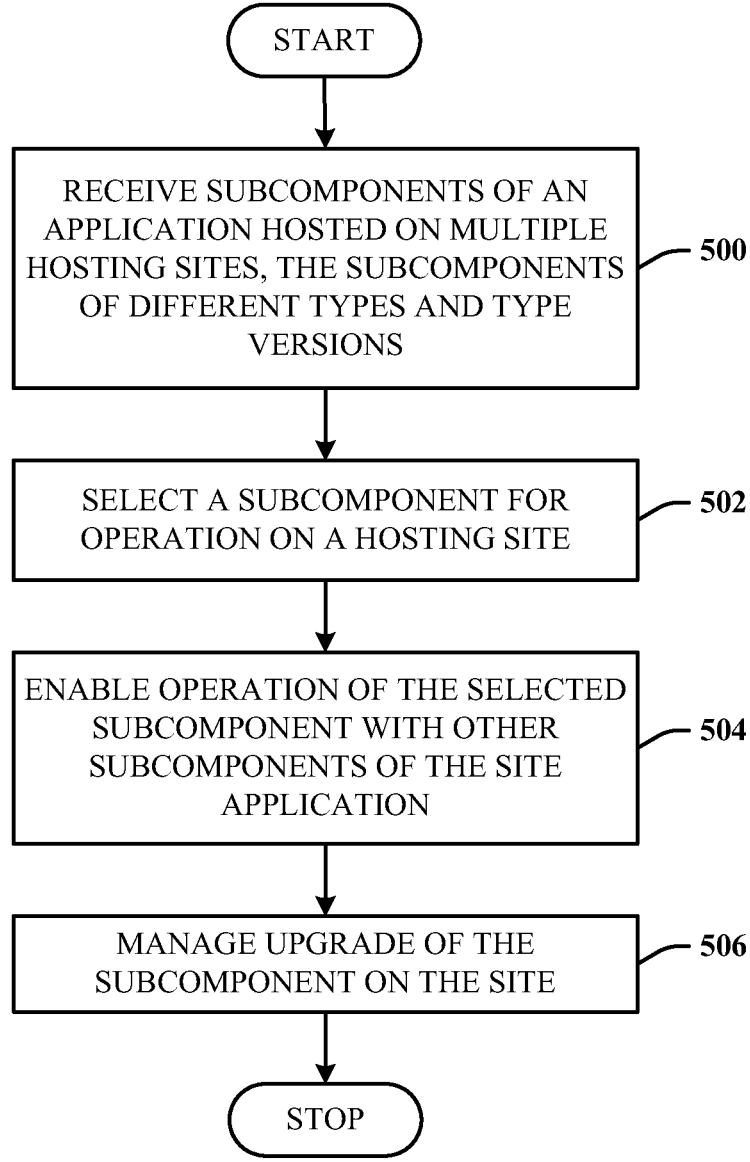
FIG. 5 illustrates an alternative component management method.

FIG. 5 illustrates an alternative component management method. At 500, subcomponents of an application hosted on multiple hosting sites are received. The subcomponents comprise different types and type versions. At 502, a subcomponent is selected for operation on a hosting site. At 504, operation of the selected subcomponent is enabled with other subcomponents of the site application. At 506, upgrade of the subcomponent is managed on the site. That is, management includes allowing the upgrade to proceed to commit, or changing back to an earlier version.

Figure 6:
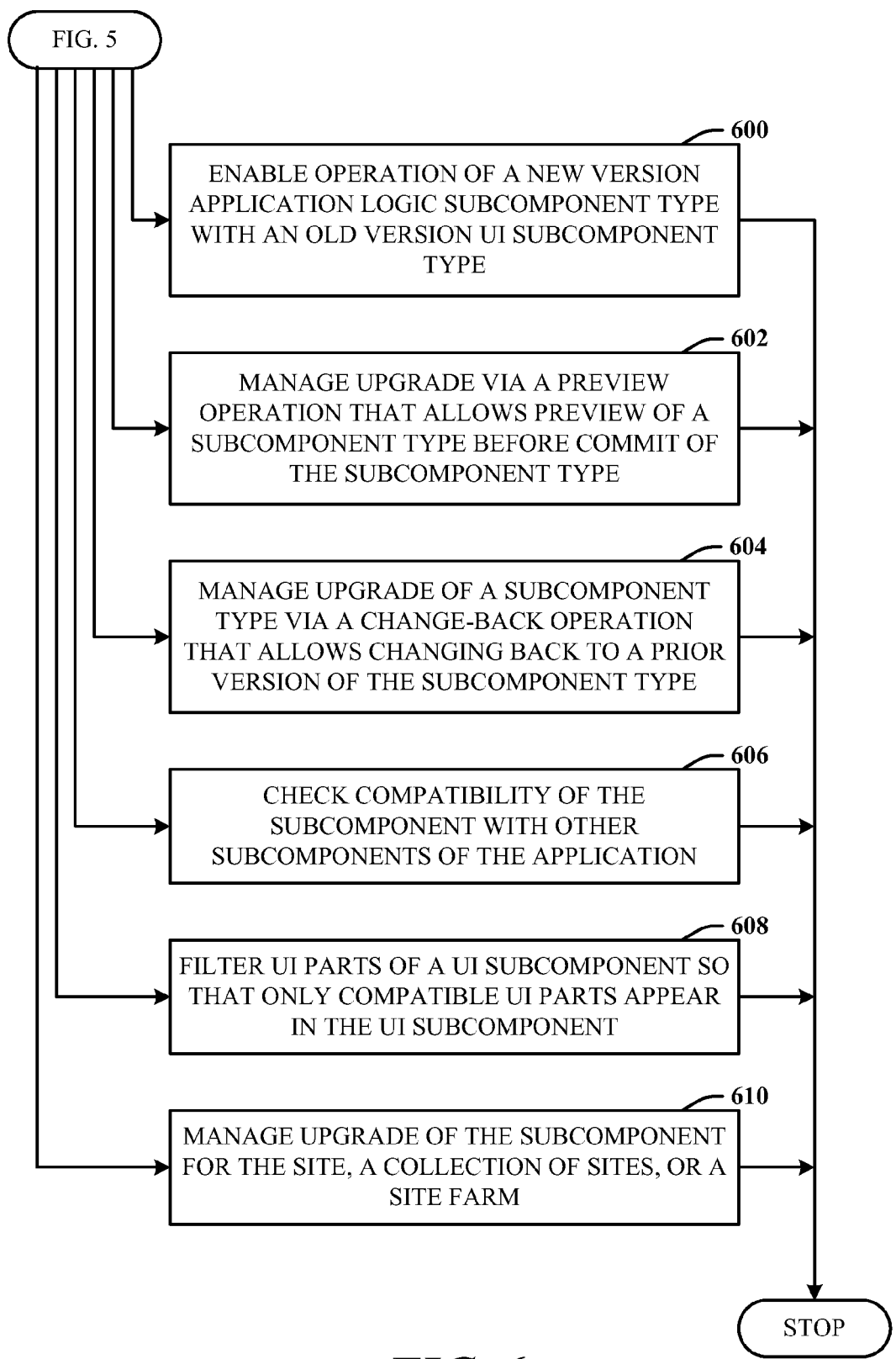
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, operation of a new version application logic subcomponent type is enabled with an old version UI subcomponent type. At 602, upgrade is managed via a preview operation that allows preview of a subcomponent type before commit of the subcomponent type. At 604, upgrade of a subcomponent type is managed via a changeback operation that allows changing back to a prior version of the subcomponent type. At 606, compatibility of the subcomponent is checked with other subcomponents of the application. At 608, UI parts of a UI subcomponent are filtered so that only compatible UI parts appear in the UI subcomponent. At 610, upgrade of the subcomponent is managed for the site, a collection of sites, or a site farm.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
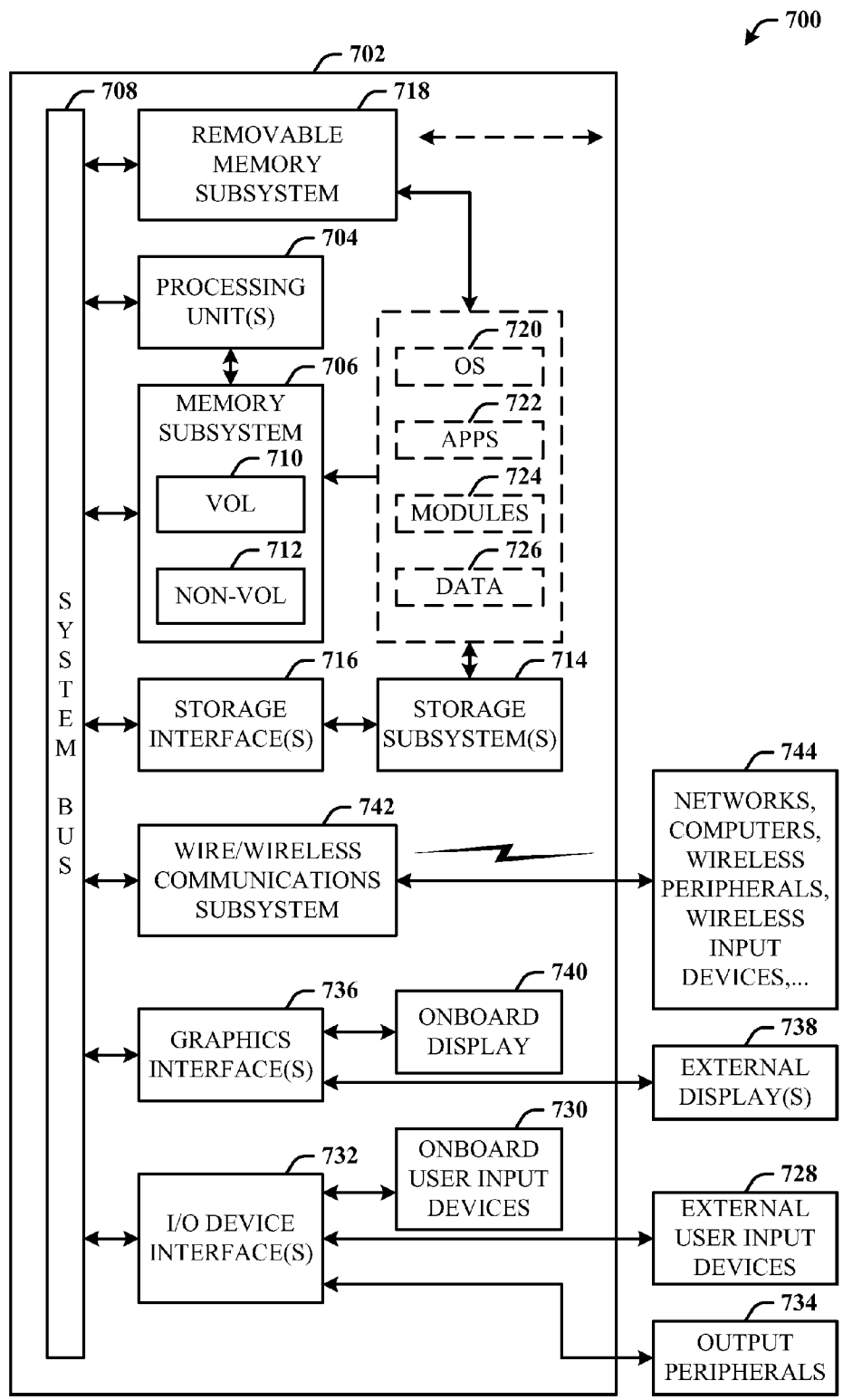
FIG. 7 illustrates a block diagram of a computing system that executes subcomponent management in accordance with the disclosed architecture.

Referring now to FIG. 7, there is illustrated a block diagram of a computing system 700 that executes subcomponent management in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the implementation system 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method, comprising:
   receiving a selection of a first version of a first subcomponent of a server application on a hosting site, the server application including a second subcomponent separate from the first subcomponent, wherein the hosting site includes a second version of the first subcomponent concurrently with the first version;
   executing the server application with the selected first version of the first subcomponent with the second subcomponent on the hosting site;
   monitoring for an indication that the selected first version of the first subcomponent is compatible with the second subcomponent; and
   in response to the monitored indication, enabling operation of the selected first version of the first subcomponent on the hosting site with the second subcomponent.

2. The computer-implemented method of claim 1 wherein the first version is newer than the second version, and wherein monitoring for the indication includes:
   monitoring for an indication that the selected newer first version of the first subcomponent is compatible with the second subcomponent; and
   in response to the received indication, replacing the second version with the newer first version of the first subcomponent on the hosting site.

3. The computer-implemented method of claim 1, further comprising:
   monitoring for an indication that the selected first version of the first subcomponent is incompatible with the second subcomponent; and
   in response to the received indication, switching the first subcomponent from the selected first version to the second version on the hosting site.

4. The computer-implemented method of claim 1 wherein the first version is newer than the second version, and wherein the method further includes:
   monitoring for an indication that the selected newer first version of the first subcomponent is incompatible with the second subcomponent; and
   in response to the received indication, switching the first subcomponent from the selected newer first version to the second version on the hosting site.

5. The computer-implemented method of claim 1 wherein the first version is newer than the second version, and wherein monitoring for the indication includes:
   monitoring for an indication that the selected newer first version of the first subcomponent is incompatible with the second subcomponent;
   in response to the received indication, switching the first subcomponent from the selected newer first version to the second version on the hosting site;
   receiving a fix to the incompatibility between the selected first version of the first subcomponent and the second subcomponent; and
   subsequently,
      executing the server application with the first version of the first subcomponent with the second subcomponent on the hosting site; and
      monitoring for an indication that the first version of the first subcomponent is compatible with the second subcomponent.

6. The computer-implemented method of claim 5, further comprising repeating the switching, receiving, executing, and monitoring for an indication that the first version of the first subcomponent is compatible with the second subcomponent operations until the first version of the first subcomponent is operating correctly with the second subcomponent of the server application.

7. The computer-implemented method of claim 1 wherein the first subcomponent is a user interface subcomponent, and wherein the second subcomponent is a logic subcomponent.

8. A computer system having a processor and a memory containing instructions that, when executed by the processor, causing the processor to perform a process comprising:
   receiving a selection of a first version a user interface subcomponent of a server application on a hosting site that also has a second version of the user interface subcomponent, the server application including a logic subcomponent separate from the user interface subcomponent, wherein the first version is newer than the second version;
allowing execution of the server application with the selected first version of the user interface subcomponent with the logic subcomponent on the hosting site;
monitoring for an indication of compatibility between the selected first version of the user interface subcomponent and the logic subcomponent; and
in response to an indication that the selected first version of the user interface subcomponent is compatible with the logic subcomponent, enabling operation of the selected first version of the user interface subcomponent on the hosting site; or
in response to another indication that the selected first version of the user interface subcomponent is incompatible with the logic subcomponent, switching the first subcomponent from the selected first version to the second version on the hosting site.

9. The computer system of claim 8, wherein the process performed by the processor further includes:
in response to the another indication that the selected first version of the user interface subcomponent is incompatible with the logic subcomponent,
receiving a fix to the incompatibility between the first version of the user interface subcomponent and the logic subcomponent; and
subsequently, executing the server application with the first version of the user interface subcomponent with the logic subcomponent on the hosting site.

10. The computer system of claim 9, wherein the process performed by the processor further includes switching the user interface subcomponent between the first version and the second version.

11. The computer system of claim 8, wherein the process performed by the processor further includes filtering parts of the first version of the user interface subcomponent for those compatible with the logic subcomponent.

12. A computer system, comprising:
a processor and a memory operatively coupled to the processor, the memory containing instructions that, when executed by the processor, causing the processor to perform a process comprising:
receiving a selection of a first version of a first subcomponent of a server application on a hosting site, the server application including a second subcomponent separate from the first subcomponent, wherein the hosting site includes a second version of the first subcomponent concurrently with the first version;
executing the server application with the selected first version of the first subcomponent with the second subcomponent on the hosting site;
monitoring for an indication that the selected first version of the first subcomponent is compatible with the second subcomponent; and
in response to the monitored indication, enabling operation of the selected first version of the first subcomponent on the hosting site with the second subcomponent.

13. The computer system of claim 12 wherein the first version is newer than the second version, and wherein monitoring for the indication includes:
monitoring for an indication that the selected newer first version of the first subcomponent is compatible with the second subcomponent; and
in response to the received indication, replacing the second version with the newer first version of the first subcomponent on the hosting site.

14. The computer system of claim 12 wherein the process performed by the processor further includes:
monitoring for an indication that the selected first version of the first subcomponent is incompatible with the second subcomponent; and
in response to the received indication, switching the first subcomponent from the selected first version to the second version on the hosting site.

15. The computer system of claim 12 wherein the first version is newer than the second version, and wherein the process performed by the processor further includes:
monitoring for an indication that the selected newer first version of the first subcomponent is incompatible with the second subcomponent; and
in response to the received indication, switching the first subcomponent from the selected newer first version to the second version on the hosting site.

16. The computer system of claim 12 wherein the first version is newer than the second version, and wherein monitoring for the indication includes:
monitoring for an indication that the selected newer first version of the first subcomponent is incompatible with the second subcomponent;
in response to the received indication, switching the first subcomponent from the selected newer first version to the second version on the hosting site;
receiving a fix to the incompatibility between the selected first version of the first subcomponent and the second subcomponent; and
subsequently,
executing the server application with the first version of the first subcomponent with the second subcomponent on the hosting site; and
monitoring for an indication that the first version of the first subcomponent is compatible with the second subcomponent.

17. The computer system of claim 16 wherein the process performed by the processor further includes repeating the switching, receiving, executing, and monitoring for an indication that the first version of the first subcomponent is compatible with the second subcomponent operations until the first version of the first subcomponent is operating correctly with the second subcomponent of the server application.

18. The computer system of claim 12 wherein the first subcomponent is a user interface subcomponent, and wherein the second subcomponent is a logic subcomponent.

* * * * *